United States Patent [19]

D'Sidocky

[11] Patent Number: 4,617,347

[45] Date of Patent: Oct. 14, 1986

[54] SULFUR CURABLE SILICONE RUBBER

[75] Inventor: Richard M. D'Sidocky, Ravenna, Ohio

[73] Assignee: The Goodyear Tire & Rubber Company, Akron, Ohio

[21] Appl. No.: 773,767

[22] Filed: Sep. 9, 1985

[51] Int. Cl.$^4$ .............................................. C08F 8/00
[52] U.S. Cl. .................................. 525/105; 528/21; 528/23; 528/27; 528/28; 525/106; 525/474
[58] Field of Search ...................... 528/21, 23, 27, 28; 525/105, 106, 474

[56] References Cited

U.S. PATENT DOCUMENTS 3,915,907 10/1975 Hopper ............................... 525/351
3,970,133 7/1976 Hopper ............................... 525/233

*Primary Examiner*—Melvyn I. Marquis
*Attorney, Agent, or Firm*—Alvin T. Rockhill

[57] ABSTRACT

Silicone rubbers can not normally be vulcanized or cured with sulfur. For this reason it has been traditionally difficult to co-cure blends of silicone rubbers and diene rubbers utilizing conventional sulfur curatives. This problem has severely limited the utilization of silicone rubber/diene rubber blends in many applications. However, this difficulty can be easily overcome by utilizing in such blends the sulfur curable silicone rubbers of the present invention. These sulfur curable silicone rubbers are prepared by modifying silicone rubbers which contain pendent vinyl groups with N-chlorothio-sulfonamides.

23 Claims, No Drawings

SULFUR CURABLE SILICONE RUBBER

BACKGROUND OF THE INVENTION

Silicone rubbers offer a unique set of desirable physical properties, such as excellent weatherability, ozone resistance, thermal stability, lubricity, and low temperature properties. However, because of their poor mechanical properties, silicone rubbers have traditionally been used in a only limited number of applications. Blends of silicone rubbers with diene rubbers which exhibit good mechanical properties as well as the highly desirable properties of silicone rubbers could be prepared and would be valuable in numerous applications if the rubbers in such blends could be co-cured with sulfur curatives. However, conventional silicone rubbers cannot be cured with sulfur curatives and for this reason in the past the possibility of making and covulcanizing such blends has been precluded.

SUMMARY OF THE INVENTION

A sulfur curable silicone rubber can be prepared by utilizing the process of this invention. It can accordingly be utilized in blends with diene rubbers and can be co-cured with them utilizing standard sulfur curatives. The vulcanizates of such blends have an outstanding combination of properties for utilization in a variety of products including conveyor belts and tires.

The present invention more specifically discloses a sulfur curable silicone rubber which is comprised of the reaction product of (1) a silicone rubber which contains pendent vinyl groups and (2) an N-chlorothio-sulfonamide having the structural formula

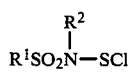

where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

where $R^3$ and $R^4$ are individually selected from said alkyl, aralkyl, and haloaryl radicals and where $R^3$ and $R^4$ can be joined together to represent radicals selected from $-CH_2-_n$, wherein n is an integer of 4 to 7, and $-CH_2-_xO-CH_2-_x$, wherein x is an integer from 2 to 6.

The present invention also reveals an elastomeric blend comprised of (1) a sulfur curable silicone rubber which is comprised of the reaction product of (a) a silicone rubber which contains pendent vinyl groups and (b) an N-chlorothio-sulfonamide having the structural formula

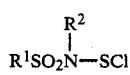

where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

where $R^3$ and $R^4$ are individually selected from said alkyl, aralkyl, and haloaryl radicals and where $R^3$ and $R^4$ can be joined together to represent radicals selected from $-CH_2-_n$, where n is an integer of 4 to 7, and $-CH_2-_xO-CH_2-_x$ wherein x is an integer from 2 to 6; and (2) one or more diene rubbers.

The present invention also specifically discloses a conveyor belt which is comprised of a sulfur cured blend of (1) a sulfur curable silicone rubber which is comprised of the reaction product of (a) a silicone rubber which contains pendent vinyl groups and (b) an N-chlorothio-sulfonamide having the structural formula

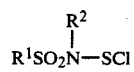

where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

where $R^3$ and $R^4$ are individually selected from said alkyl, aralkyl, and haloaryl radicals and where $R^3$ and $R^4$ can be joined together to represent radicals selected from $-CH_2-_n$, where n is an integer of 4 to 7, and $-CH_2-_xO-CH_2-_x$ wherein x is an integer from 2 to 6; and (2) a nitrile rubber.

DETAILED DESCRIPTION OF THE INVENTION

The silicone rubbers which contain pendent vinyl groups that can be utilized in making the sulfur curable silicone rubbers of the present invention generally have the structural formula

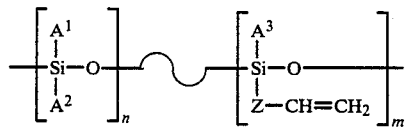

wherein $A^1$, $A^2$, and $A^3$ can be the same or different and are selected from the group consisting of alkyl groups containing from 1 to 20 carbon atoms, alkaryl groups containing from 7 to 20 carbon atoms, aralkyl groups containing from 7 to 20 carbon atoms, haloaryl groups containing from 6 to 10 carbon atoms, and phenyl groups; wherein z represents an alkylene group containing from 0 to 6 carbon atoms; wherein n and m represent integers; and wherein ∽ indicates that the distribution of repeat units can be random. Z can represent either a straight chain or a branched alkylene group. In cases where Z represents an alkylene group containing O carbon atoms the vinyl group is bonded directly to the silicon atom (there is not actually an alkylene group). Some representative examples of such alkylene groups include methylene, ethylene, and propylene. Normally $A^1$, $A^2$, and $A^3$ will represent alkyl groups containing from 1 to 8 carbon atoms or phenyl groups. $A^1$, $A^2$, and $A^3$ will preferably be either methyl groups or phenyl groups with methyl groups being most preferred. Thus, a highly preferred silicone rubber which contains pendent vinyl groups for utilization in this invention has the structural formula

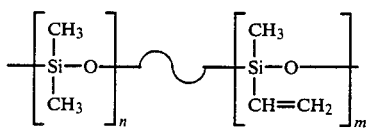

wherein n and m represent integers and wherein indicates that the distribution of repeat units can be random.

The N-chlorothio-sulfonamides utilized in this invention to modify silicone rubbers which contain pendent vinyl groups so as to make them sulfur curable have the structural formula

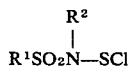

where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

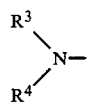

where $R^3$ and $R^4$ are individually selected from said alkyl, aralkyl, and haloaryl radicals and where $R^3$ and $R^4$ can be joined together to represent radicals selected from $—CH_2—_n$, where n is an integer of 4 to 7, and $—CH_2—_xO—CH_2—_x$ wherein x is an integer from 2 to 6. In these N-chlorothio-sulfonamides, $R^1$ and $R^2$ are preferably selected from alkyl radicals having 1 to 6 carbon atoms, phenyl radicals, monoalkyl substituted phenyl radicals having from 7 to 10 carbon atoms and dialkylsubstituted phenyl radicals having from 8 to 11 carbon atoms. Most preferably $R^1$ and $R^2$ are radicals selected from the group consisting of methyl groups, ethyl groups, propyl groups, butyl groups, phenyl groups, and p-chlorophenyl groups. In cases wherein $R^1$ and $R^2$ are joined together by a radical of the formula $—CH_2—_xO—CH_2—_x$ it is preferred for x to represent 2.

Representative of radicals suitable for $R^1$ are radicals selected from methyl, tert-butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R^2$ are methyl, tert butyl, 1-eicosyl, cyclohexyl, benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)phenyl radicals.

Representative examples of N-chlorothio-sulfonamides which can be used in the present invention are
N-chlorothio-N-methyl-methanesulfonamide,
N-chlorothio-N-methyl-benzenesulfonamide,
N-chlorothio-N-methyl-p-toluenesulfonamide,
N-chlorothio-N-ethyl-p-toluenesulfonamide,
N-chlorothio-N-methyl-ethanesulfonamide,
N-chlorothio-N-phenyl-p-toluenesulfonamide,
N-chlorothio-N-(2-propyl)-methanesulfonamide,
N-chlorothio-N-(1-propyl)-p-chlorobenzenesulfonamide,
N-chlorothio-N-phenyl-methanesulfonamide,
N-chlorothio-N,N',N'-trimethylsulfamide,
N-chlorothio-N-methyl-N',N-(pentamethylene)sulfamide,
N-chlorothio-N-methyl-N',N-diethylsulfamide and
N-chlorothio-N-phenyl-benzenesulfonamide.

Chlorothiosulfonamides suitable for use in the present invention, as well as their preparation, have further been described in the patent literature. For example, West German DPS No. 1,156,403, which is incorporated herein by reference in its entirety, shows the preparation of chlorothiosulfonamides by reaction of a sulfonamide with $S_2Cl_2$ in the presence of an organic acid acceptor. West German DPS No. 1,101,407 shows the preparation of chlorothiosulfonamides from N,N'-dithiobis(sulfonamides) and chlorine or sulfuryl chloride. The chlorothiosulfonamides of the present invention can be prepared by analogous procedures.

The silicone rubber containing pendent vinyl groups can be modified with an N-chlorothio-sulfonamide by utilizing one of several techniques. One such method involves addition of the N-chlorothio-sulfonamide to a solution of the silicone rubber containing pendent vinyl groups in an inert organic solvent, such as chloroform, hexane, benzene, or toluene. More polar solvents are preferred since they increase the rate of formation of polymer bound adduct. For example, adduct formation occurs much more rapidly when chloroform is utilized as the solvent than it does when hexane is utilized as the solvent. A mixture of nonpolar solvent with a highly polar solvent may be used advantageously. For example, a mixture of 40 volumes of hexane and 1 volume of acetic acid can produce substantially faster adduct formation as compared to utilizing hexane alone. Furthermore, the rate of adduct formation can apparently be markedly improved by contact or catalysis with anhydrous zinc chloride.

A second method comprises swelling a solution of the chlorothiosulfonamide into the polymer using the same type of solvents. Preferably, the solvent/polymer ratio is selected so that essentially all the solvent is taken up by the polymer. For this process, it is preferable that the polymer is first prepared in the form of small chunks, or crumbs, and the solvent then added.

A third technique comprises directly milling the chlorothiosulfonamide into the polymer by means of an internal mixer (Banbury or extruder type) or an open roll mill. For direct mixing, it is advantageous to suspend or dissolve the chlorothiosulfonamide in a relatively inert medium such as mineral oil or chlorinated paraffin in order to improve dispersion as well as minimize hydrolysis by atmospheric moisture.

The additions of the N-chlorothio-sulfonamide in solution, or by swelling may be generally carried out at a temperature in the range of about 10° C. to about 125° C., but preferably in a range of about 20° C. to about 80° C., ambient temperature being the most convenient and practical in the majority of cases. Direct mixing is preferably carried out at the lowest temperature compatible with good polymer processing characteristics, usually in the about 60° C. to about 130° C. temperature range.

The preferred amount of chlorothiosulfonamide added depends on the specific nature of the silicone rubber being modified, the specific nature of any diene rubbers that may be blended with the modified silicone rubber, the specific cure system that will ultimately be employed and the characteristics desired for the final vulcanizate. The molar ratio of chlorothiosulfonamide employed to vinyl groups in the silicone rubber being treated will generally be in the range of from about 0.1:1 to about 1.2:1. It is generally preferred for this ratio to be within the range of about 0.9:1 to about 1.1:1. It will normally be most preferred for a molar ratio of 1:1 to be utilized.

The sulfur curable silicone rubbers of the present invention can be blended with one or more diene rubbers and co-cured with them using a sulfur based curative. Such blends can be tailor-made so as to provide a desired combination of properties that could not otherwise be attained. This is because such blends can take advantage of the outstanding properties associated with silicone rubbers. Perhaps the most outstanding property associated with silicone rubber is its great resistance to temperature extremes. In fact, under normal operating conditions, temperatures as high as 600° F. (316° C.) and as low as $-150°$ F. ($-101°$ C.) have little affect on the physical and electrical properties of silicone rubbers. At these extreme temperatures, tensile strength, elongation and abrasion resistance of silicone rubbers is far superior to those of most organic based rubbers. Additionally silicone rubbers have an outstanding ability to absorb energy over a wide range of frequencies and temperatures which provides them with excellent vibration dampening ability. This property of silicone rubbers makes them ideally suited for use in vibration control devices. Silicone rubbers also have excellent chemical resistance, fungus resistance, resistance to weathering, and outstanding lubricity.

The amount of sulfur curable silicone rubber utilized in such blends will, of course, vary greatly with the type of diene rubber being utilized in the blend and with the desired properties of the sulfur cured vulcanizate being made. However, normally such blends will contain from about 2 weight percent silicone rubber to about 98 weight percent silicone rubber based upon the total weight of the rubbers utilized in the blend (such blends will contain from about 2 weight percent to about 98 weight percent diene rubbers). The diene rubbers that can be utilized in such blends contain repeat units which are derived from one or more conjugated diene monomers or non-conjugated diene monomers. Such diene polymers can also contain repeat units which are derived from other copolymerizable unsaturated monomers, such as ethylene and propylene. These diene rubbers will also commonly contain repeat units which are derived from one or more vinyl aromatic monomers, such as styrene or alpha-methylstyrene. In most cases the diene rubbers utilized in the blends of this invention will contain from about 50 weight percent to 100 weight percent diene monomers and from 0 weight percent to about 50 weight percent copolymerizable monomers. Some representative examples of diene rubbers that can be utilized in such blends include natural rubber, synthetic polyisoprene, nitrile rubber, polybutadiene, and styrene-butadiene rubber.

A blend containing about 2% to about 8% sulfur curable silicone rubber and from about 92 weight percent to 98 weight percent nitrile rubber can be used advantageously in making conveyor belts which are used for transporting coal tar. Such belts are normally made utilizing only nitrile rubber because of its good abrasion resistance. However, coal tar has a propensity to stick to such belts which are made of nitrile rubber. The magnitude of this particular problem can be greatly reduced by utilizing a blend of sulfur curable silicone rubber and nitrile rubber in manufacturing belts for transporting coal tar. This is because the sulfur curable silicone rubber utilized in the blend provides the conveyor belt with better lubricity and thus greatly reduces the tendency for coal tar to stick to the belt. Such conveyor belts which are designed for the particular purpose of transporting coal tar are otherwise manufactured in essentially the same manner as are conventional conveyor belts designed for transporting coal tar. Such belts which are comprised of a nitrile rubber and a sulfur curable silicone rubber can, of course, also contain reinforcing elements, antidegradants, and other desired chemical agents well known to persons skilled in the art. Such conveyor belts for coal tar applications will preferably be comprised of from 94 to 96 weight percent nitrile rubber and from 4 to 6 weight percent sulfur curable silicone rubber, based upon the total rubbers utilized in the conveyor belt.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

N-chlorothio-N-methyl-p-toluene-sulfonamide was synthesized in a 100 milliliter flask which was fitted with a condenser that was 15 centimeters long. A glass nitrogen inlet tube was positioned down the center of the condenser such that the height could be adjusted for above surface or below surface addition. A boiling chip, 22 grams of N,N'-dimethyl-N,N'-dithiobis(p-toluene sulfonamide), 60 milliliters of dichloromethane, and 6.75 grams of sulfuryl chloride were added to the flask. The resulting yellow solution was gently refluxed for 3 hours under nitrogen which was applied as a slow above surface purge. The condenser water was then turned off, which resulted in the temperature increasing, and the nitrogen was bubbled below the surface to evaporate some of the dichloromethane in order to insure that sulfur dioxide which was produced as a by-product was removed. The solution was then cooled to room temperature, transferred to a glass graduated cylinder which was equipped with a stopper to minimize exposure to air and it was determined that the total volume of the solution collected was 52 milliliters. It was further determined by chemical analysis that the solution formed was a 1.9M solution of N-chlorothio-N-methyl-p-toluene sulfonamide.

EXAMPLE 2

A silicone rubber which contained pendent vinyl groups was modified with the N-chlorothio-N-methyl-p-toluene sulfonamide prepared in Example 1. The apparatus used in this process was a one liter, 3-necked flask equipped with a paddle stirrer, thermometer, and nitrogen inlet and outlet. 100 grams of the silicone rubber containing pendent vinyl groups (Union Carbide's W-9605) was added to the flask with 150 milliliters of dichloromethane. The resulting mixture was stirred until the silicone rubber dissolved, resulting in an easily stirrable solution. In order to neutralize any traces of hydrochloric acid which might have resulted from the modifier hydrolysis, 0.04 grams of pigment grade calcium carbonate (Pfizer Multiflex TM MM) was added to the solution. Then 32 milliliters of the N-chlorothio-N-methyl-p-toluene sulfonamide modifier prepared in Example 1 was added to the solution as a 1.9M solution. The resulting mixture was stirred thoroughly and allowed to stand at room temperature under nitrogen for 20 hours. At that point, 0.5 milliliters of cyclohexane was added and the solution was stirred for 1.5 hours to react away any excess modifier. The modified silicone rubber was coagulated by mixing the solution formed with 500 milliliters of methanol. The solvents were then decanted and the coagulum was twice washed with 100 milliliters of methanol. The modified silicone rubber was placed in a polyethylene container and dried in a vacuum oven for 20 hours at 60° C. with aspirator vacuum. No problems with foaming were experienced. Analytical analysis by NMR spectrometry showed the presence of all expected adduct resonances and a virtual absence of unreacted vinyl groups. Thus, the procedure utilized resulted in the synthesis of a sulfur curable silicone rubber.

EXAMPLE 3

The sulfur curable silicone rubber synthesized in Example 2 was then compounded with diene rubber in order to ascertain the cure characteristics of such a blend. In this procedure, 10 parts of the sulfur curable silicone rubber made in Example 2 was compounded with 50 parts of natural rubber, 50 parts of high cis-1,4-polybutadiene, 1 part of stearic acid, 1 part of an antioxidant, 3.5 parts of zinc oxide, 1.7 parts of sulfur, 1 part of a sulfenamide accelerator, and 0.1 part of tetramethylthiuram disulfide (a secondary accelerator). The cure characteristics for this blend is reported in Table I.

COMPARATIVE EXAMPLE 1

The procedure utilized in Example 3 was repeated in this experiment except that a standard silicone rubber was substituted for the sulfur curable silicone rubber utilized in Example 3. The cure characteristics for this blend is reported in Table I:

TABLE I

| Cure Characteristics | Example 3 | Comparative Example 1 |
| --- | --- | --- |
| $M_H$, dN · m | 64 | 43 |
| $M_L$, dN · m | 11.25 | 8 |
| $M_H$-$M_L$, dN · m | 52.75 | 35 |
| $T_{90}$, min | 14.0 | 4 |
| $T_{25}$, min | 10.75 | 3.25 |
| $T_2$, min | 8 | 3 |

The rheometer cure properties shown in Table I were determined at 150° C. using a Monsanto oscillating disc rheometer. A description of oscillating disc rheometers can be found in the *Vanderbilt Rubber Handbook* edited by Robert O. Babbit (Norwalk, Conn., R. T. Vanderbilt Company, Inc., 1978), pp. 583-591. The use of this cure meter and standardized values read from the curve are specified in ASTM D-2084. A typical cure curve obtained on an oscillating disc rheometer is shown on page 588 of this edition of the *Vanderbilt Rubber Handbook*.

In such an oscillating disc rheometer compounded rubber samples are subjected to an oscillating shearing action of constant amplitude. The torque of the oscillating disc embedded in the stalk that is being tested that is required to oscillate the rotor at the vulcanization temperature is measured. The values obtained using this cure test are very significant since changes in the rubber or the compounding recipe are very readily detedted.

The cure curves that were obtained were used to determine a torque minimum ($M_L$), a torque maximum ($M_H$), minutes to 90% of the torque increase ($T_{90}$), minutes to 25% of the torque increase ($T_{25}$), and minutes to a 2 point torque increase ($T_2$).

The use of unmodified silicone rubber gave a very low rheometer value indicating a plasticizing affect, whereas the modified silicone rubber prepared in Example 3 showed a much higher value indicating an increased state of cure. This comparative example clearly shows that the blend prepared in Example 3 co-cured. The modified silicone rubber prepared in Example 3 had a retarding effect on scorch in the blend prepared as compared to the unmodified silicone rubber utilized in comparative Example 1.

The vulcanized blend prepared in Example 3 showed no silicone bloom problems which is in contrast to the blend which was prepared in Comparative Example 1 which had silicone droplets on the surface of the rubber after curing.

While certain representative embodiments and details have been shown for the purpose of illustrating the present invention, it will be apparent to those skilled in this art that various changes and modifications can be made without departing from the scope of the present invention.

What is claimed is:

1. A sulfur curable silicone rubber which is comprised of the reaction product of (1) a silicone rubber which contains pendent vinyl groups and (2) an N-chlorothio-sulfonamide having the formula

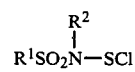

where $R^1$ and $R^2$ are selected from the group consisting of alkyl radicals having 1-20 carbon atoms, aralkyl radicals having 7-20 carbon atoms, alkaryl radicals having from 7-20 carbon atoms, and haloaryl radicals having 6-10 carbon atoms and where $R^1$ is also selected from radicals having the formula

where $R^3$ and $R^4$ are individually selected from said alkyl, aralkyl, and haloaryl radicals and where $R^3$ and $R^4$ can be joined together to represent —CH$_2$—$_n$ radicals where n is an integer of 4 to 7.

2. An elastomeric blend comprised of (1) a sulfur curable silicone rubber which is comprised of the reaction product of (a) a silicone rubber which contains pendent vinyl groups and (b) an N-chlorothio-sulfonamide having the structural formula

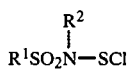
R$^1$SO$_2$N—SCl where R$^1$ and R$^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where R$^1$ is also selected from radicals having the formula

where R$^3$ and R$^4$ are individually selected from said alkyl, aralkyl, and haloaryl radicals and where R$^3$ and R$^4$ can be joined together to represent —CH$_2$—$_n$ radicals where n is an integer of 4 to 7; and (2) one or more diene rubbers.

3. An elastomeric blend as specified in claim 2 wherein said blend is in the form of a sulfur cured vulcanizate.

4. A conveyor belt which is particularly useful for transporting coal tar which is comprised of a sulfur cured blend of (1) a sulfur curable silicone rubber which is comprised of the reaction product of (a) a silicone rubber which contains pendent vinyl groups and (b) an N-chlorothio-sulfonamide having the structural formula

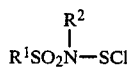
R$^1$SO$_2$N—SCl where R$^1$ and R$^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where R$^1$ is also selected from radicals having the formula

where R$^3$ and R$^4$ are individually selected from said alkyl, aralkyl, and haloaryl radicals and where R$^3$ and R$^4$ can be joined together to represent —CH$_2$—$_n$ radicals where n is an integer of 4 to 7; and (2) a nitrile rubber.

5. A conveyor belt as specified in claim 4 wherein R$^1$ and R$^2$ in said N-chlorothio-sulfonamide are selected from the group consisting of methyl groups, ethyl groups, propyl groups, butyl groups, phenyl groups, and p-chlorophenyl groups.

6. A sulfur curable silicone rubber as specified in claim 1 wherein said silicone rubber which contains pendent vinyl groups has the structural formula

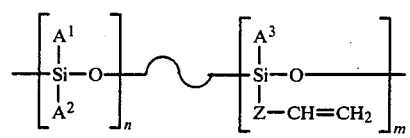

wherein A$^1$, A$^2$, and A$^3$ can be the same or different and are selected from the group consisting of alkyl groups containing from 1 to 20 carbon atoms, alkaryl groups containing from 7 to 20 carbon atoms, aralkyl groups containing from 7 to 20 carbon atoms, haloaryl groups containing from 6 to 10 carbon atoms, and phenyl groups; wherein z represents an alkylene group containing from 0 to 6 carbon atoms; wherein n and m represent integers; and wherein ⌒⌒ indicates that the distribution of repeat units can be random.

7. A sulfur curable silicone rubber as specified in claim 6 wherein R$^1$ and R$^2$ are selected from the group consisting of alkyl radicals containing from 1 to 6 carbon atoms, phenyl radicals, monoalkyl substituted phenyl radicals containing from 7 to 10 carbon atoms, and dialkylsubstituted phenyl radicals containing from 8 to 11 carbon atoms.

8. A sulfur curable silicone rubber as specified in claim 7 wherein A$^1$, A$^2$, and A$^3$ are selected from the group consisting of alkyl groups containing from 1 to 8 carbon atoms and phenyl groups.

9. A sulfur curable silicone rubber as specified in claim 8 wherein Z represents an alkylene group containing 0 carbon atoms.

10. A sulfur curable silicone rubber as specified in claim 9 wherein A$^1$, A$^2$, and A$^3$ are selected from the group consisting of methyl groups and phenyl groups.

11. A sulfur curable silicone rubber as specified in claim 6 wherein R$^1$ is selected from the group consisting of methyl, tert-butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals and wherein R$^2$ is selected from the group consisting of methyl, tert butyl, 1-eicosyl, cyclohexyl, benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)phenyl radicals.

12. A sulfur curable silicone rubber as specified in claim 10 wherein said N-chlorothio-sulfonamide is selected from the group consisting of
N-chlorothio-N-methyl-methanesulfonamide,
N-chlorothio-N-methyl-benzenesulfonamide,
N-chlorothio-N-methyl-p-toluenesulfonamide,
N-chlorothio-N-ethyl-p-toluenesulfonamide,
N-chlorothio-N-methyl-ethanesulfonamide,
N-chlorothio-N-phenyl-p-toluenesulfonamide,
N-chlorothio-N-(2-propyl)-methanesulfonamide,
N-chlorothio-N-(1-propyl)-p-chlorobenzenesulfonamide,
N-chlorothio-N-phenyl-methanesulfonamide,
N-chlorothio-N,N',N'-trimethylsulfamide,
N-chlorothio-N-methyl-N',N-(pentamethylene)sulfamide,
N-chlorothio-N-methyl-N',N-diethylsulfamide and
N-chlorothio-N-phenyl-benzenesulfonamide.

13. A sulfur curable silicone rubber as specified in claim 12 wherein said silicone rubber which contains pendent vinyl groups has the structural formula

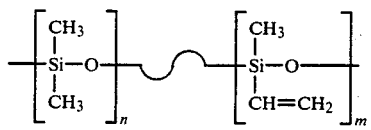

wherein n and m represent integers and wherein ⁀⌣ indicates that the distribution of repeat units can be random.

14. An elastomeric blend as specified in claim 3 wherein said blend is comprised of from 2% to 98% by weight of said sulfur curable silicone rubber and from 2% to 98% by weight of one or more diene rubbers.

15. An elastomeric blend as specified in claim 14 wherein said diene rubbers are selected from the group consisting of natural rubber, synthetic polyisoprene, nitrile rubber, polybutadiene, and styrene-butadiene rubber.

16. A sulfur curable silicone rubber which is comprised of the reaction product of (1) a silicone rubber which contains pendent vinyl groups and (2) an N-chlorothio-sulfonamide having the formula

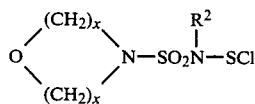

wherein $R^2$ is selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms; and wherein x is an integer from 2 to 6.

17. A sulfur curable silicone rubber as specified in claim 16 wherein x represents 2.

18. A sulfur curable silicone rubber as specified in claim 13 wherein said N-chlorothio-sulfonamide is N-chlorothio-N-methyl-p-toluene-sulfonamide.

19. An elastomeric blend which is comprised of (1) the sulfur curable silicone rubber specified in claim 16 and (2) one or more diene rubbers.

20. An elastomeric blend as specified in claim 19 wherein said blend is in the form of a sulfur cured vulcanizate.

21. An elastomeric blend as specified in claim 20 wherein x represents 2; wherein said blend is comprised of from 2% to 98% by weight of said sulfur curable silicone rubber and from 2% to 98% by weight of one or more diene rubbers; and wherein said diene rubbers are selected from the group consisting of natural rubber, synthetic polyisoprene, nitrile rubber, polybutadiene, and styrene-butadiene rubber.

22. A conveyor belt as specified in claim 5 which is comprised of from 92 weight percent to 98 weight percent of said nitrile rubber and from 2 weight percent to 8 weight percent of said sulfur curable silicone rubber.

23. A conveyor belt which is particularly useful for transporting coal tar which is comprised of a sulfur cured blend of (1) the sulfur curable silicone rubber specified in claim 16 and (2) a nitrile rubber.

* * * * *